United States Patent [19]

Brame

[11] Patent Number: 4,864,127

[45] Date of Patent: Sep. 5, 1989

[54] EARTH SURFACE HYDROCARBON GAS CLOUD DETECTION BY USE OF LANDSAT DATA

[76] Inventor: Durward B. Brame, 2510 Richmond Dr., Arlington, Tex. 76014

[21] Appl. No.: 891,154

[22] Filed: Jul. 31, 1986

[51] Int. Cl.[4] ............................................. G01V 3/165
[52] U.S. Cl. .................................. 250/253; 250/334; 250/341; 324/330
[58] Field of Search ................... 250/341, 253, 334; 324/330, 335, 337, 365

[56] References Cited

U.S. PATENT DOCUMENTS

| 3,153,147 | 10/1964 | Bradley et al. | 324/330 |
| 4,100,481 | 7/1978 | Gournay | 324/337 |
| 4,310,057 | 1/1982 | Brame | 73/864.74 |
| 4,421,981 | 12/1983 | Hough | 250/253 |
| 4,449,047 | 5/1984 | Monroe | 250/253 |
| 4,490,613 | 12/1984 | Brame | 250/253 |
| 4,678,911 | 7/1987 | Sundberg et al. | 250/253 |

OTHER PUBLICATIONS

"Ocean Current Monitoring Employing a New Satellite Sensing Technique", by A. Strong and R. DeRucke, Science, vol. 182, No. 4111, pp. 482-484, Nov. 2, 1973.

Primary Examiner—Janice A. Howell
Assistant Examiner—William F. Rauchholz
Attorney, Agent, or Firm—Head & Johnson

[57] ABSTRACT

A method of locating potential oil and gas reservoirs in the earth utilizing a satellite equipped to receive reflected solar energy from the earth at at least one selected frequency band, transmitting signals indicative of the received reflected energy to the earth, recording the received signals in a manner to provide a map of the earth's surface, filtering the received signals to provide signals representative of bands characterized by hydrocarbon gas absorption of the solar energy, and displaying the filtered signals, the area of hydrocarbon absorption being indicated by low intensity levels. The satellite system can be equipped with a coherent infrared irradiation system which scans the area of observation, utilizing a selected infrared wave length beam to augment normal solar radiation at those wave lengths most effective for detecting the hydrocarbon gas cloud which appears above an oil or gas reservoir.

8 Claims, 2 Drawing Sheets

EARTH SURFACE HYDROCARBON GAS CLOUD DETECTION BY USE OF LANDSAT DATA

SUMMARY OF THE INVENTION

The disclosure covers the use of infrared electromagnetic radiation to energize hydrocarbon gas molecules at their fundamental vibrational frequencies which causes the molecules to enter an excited vibrational state. This excited state is maintained momentarily, but sufficiently long to encounter other molecules such as oxygen or nitrogen, to which it transfers a discrete amount of its energy. Since the excited hydrocarbon gas molecule loses part of its energy when it drops back to the ground state, which occurs in a very short period of time, it re-radiates electromagnetic energy at a slightly longer wave length than the energizing infrared beam, resulting in a net loss of energy (absorption).

It is the absorbed energy which is detected by a suitable detector and converted to an electrical signal or signals for visual display, or pictorial representation.

Since the sun radiates at all frequencies and the atmosphere of the earth is transparent to the various fundamental frequencies which excite the hydrocarbon gas molecules, it is possible to detect the existence of hydrocarbon gas molecules which are excited by solar energy at the excitation wave length by the system disclosed in U.S. Pat. No. 4,490,613 by this absorption phenomena. The pictorial representation or visual representation of the hydrocarbon gas anomaly is generated by electrical signals derived from the method which includes computer enhancement of the signal received so as to increase that portion of the signal represented by the selected "windows". Since solar energy can augment the pictorial or visual representation disclosed in U.S. Pat. No. 4,490,613, it follows that satellite or Landsat data can be analyzed in such a way as to visually or pictorially concentrate on those wave lengths represented by the five "windows" described in U.S. Pat. No. 4,490,613. This concentration or enhancement of specific portions of the broad band wave lengths detected by the satellite systems, i.e., the multispectral scanner system of the thematic mapper system is accomplished by a computer system which can screen the base satellite data in multiples or submultiples of the specific hydrocarbon gas molecules fundamental vibrational frequencies as described in lines 12 through 68 of column 6 and lines 1 through 19 of column 7 of the above patent.

By computer enhancement of the data as described above, it is possible to pictorially or visually represent those areas on the earth which exhibit hydrocarbon gas microseeps, for oil and gas exploration purposes.

To further improve the ability of the satellite system to gather data useful for soil and gas exploration purposes, a system is designed to direct a beam of coherent radiation from the satellite to the earth such that the path scanned by the satellite is at the same time irradiated by a selected wave length of infrared radiation as described by U.S. Pat. No. 4,490,613 to increase and augment the absorption of molecular vibrational energy by the hydrocarbon gas molecules to increase visability of hydrocarbon gas microseeps for oil and gas exploration purposes.

The technique developed also has the unique capability to reveal subsurface micro-drainage patterns related to original deposition of the oil or gas and, therefore, would be useful for well siting and petroleum production purposes.

DESCRIPTION OF THE PREFERRED EMBODIMENTS OF THE INVENTION

Figure 1:
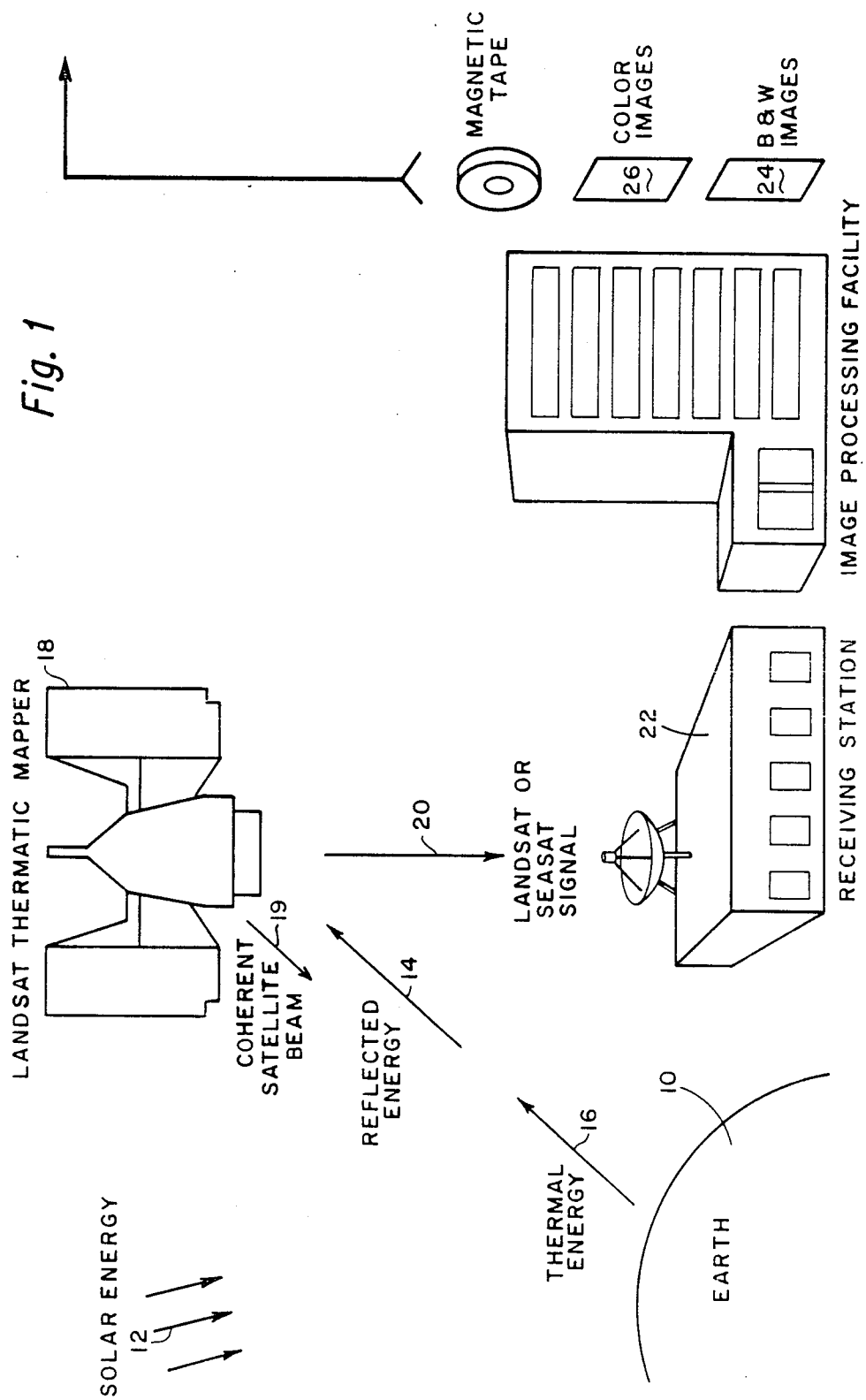
FIG. 1 is a diagrammatic representation of a satellite adapted to resolve reflected solar energy and for transmitting signals at selected band widths to the earth where it is received, recorded and processed.

Referring first to FIG. 1 the earth is indicated by the numeral 10 and receives solar energy 12. A significant portion of this solar energy is reflected from the earth as reflected solar energy number 14. A small portion of the energy emanating from the earth is thermal energy 16.

Reflected energy is received by a satellite 18 which preferably travels in an evolving circular or elliptical pattern in which the earth slowly moves relative to the pattern whereby the satellite 18 periodically appears directly overhead of all portions of the earth. The satellite 18 may be typically the presently employed Landsat thematic mapper satellite which receives signals in various bands. The satellite preferably has the capability to direct a coherent beam 19 of infrared electromagnetic energy at a selected wave length which scans the same earth area viewed by the satellite. The reflected signals are recorded in the satellite and are periodically retransmitted as signals 20 to an earth receiving station 22 where thereafter the signals are thoroughly processed, including the use of computer enhancement. The processed signals are typically stored separately in several different bands thereby providing a plurality of bands representing each geographical area of the earth. These signals are filtered and processed and can then be transformed by video into black and white images 24 or into color images 26. The signals are typically stored on a plurality of magnetic tapes.

Figure 2:
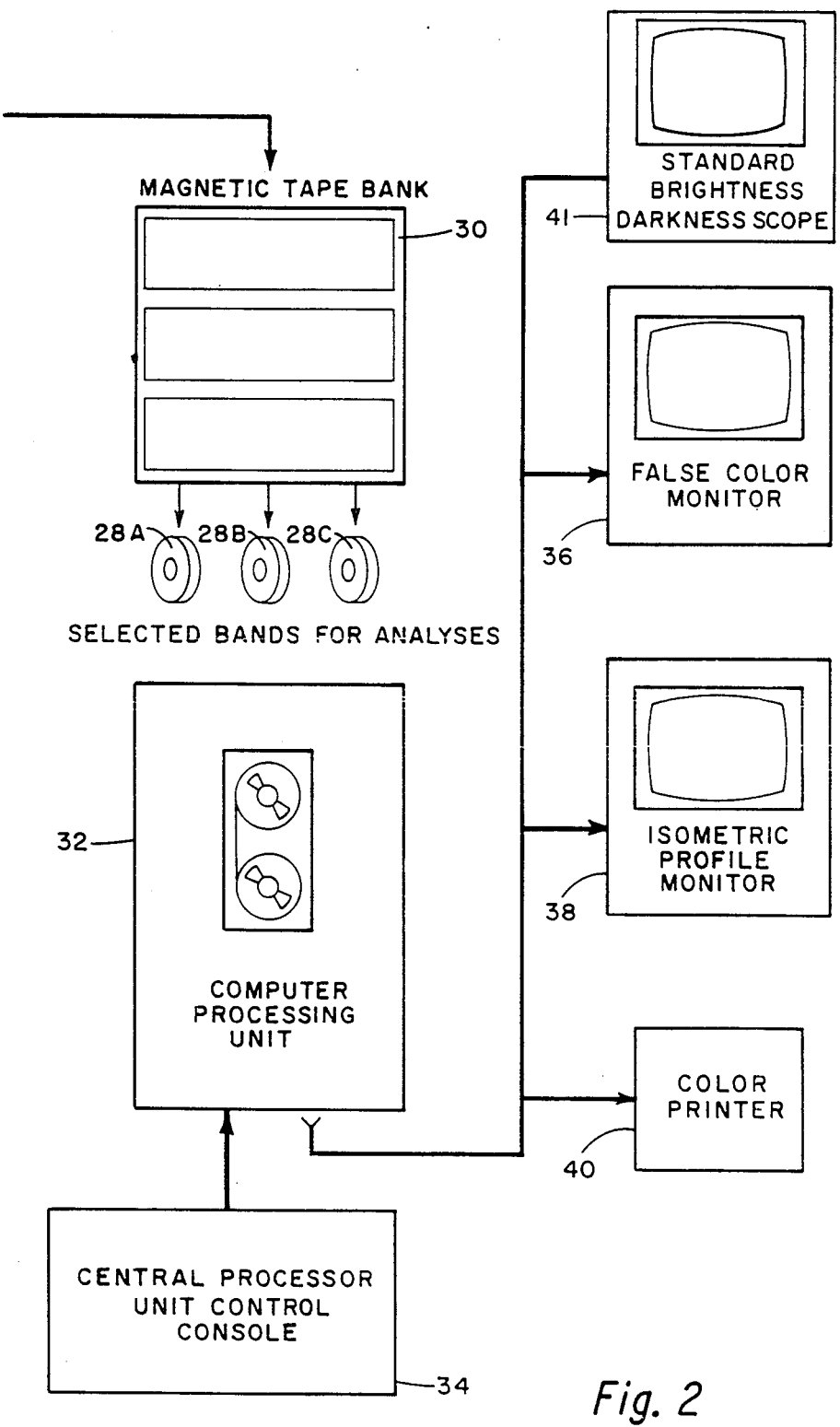
FIG. 2 is a diagrammatic representation of apparatus for treatment of the recorded satellite received signals for use in indicating areas of the earth displaying the potential of oil and gas deposits.

As shown in FIG. 2, the magnetic tapes are stored in a tape bank 30 thereby providing tapes for mapped geographical areas in separately available band widths.

By the process of this invention, and as will be described in more detail subsequently, when a particular geographical area is to be investigated for indications of potential deposits of oil and gas hydrocarbons, selected tapes 28A, 28B and 28C are taken from the magnetic tape bank 30. Tapes are individually processed in a computer processing unit 32 as controlled by central process unit control console 34. From the computer processing unit 32 signals are conveyed to video monitors and printers indicated by a false color monitor 36, an isometric profile monitor 38, a color printer 40 and a standard brightness/darkness scope 41. The monitors 36 and 38 in printer 40 are emblematic of different types of monitors and printers which may be employed. The color printer 40 functions to make a record on paper of that scene displayed on one of the monitors for permanent record purposes. The scope 41 serves as a standard brightness/darkness reference which is used to adjust the monitor for quantification of data, and to insure consistency.

The Landsat thematic mapper provides data in seven different wave length bands, i.e., band 1 from 0.45 to 0.52 micrometers, band 2 from 0.52 to 0.60 micrometers, band 3 from 0.63 to 0.69 micrometers, band 4 from 0.76 to 0.90 micrometers, band 5 from 1.55 to 1.75 micrometers, band 7 from 2.08 to 2.35 micrometers and band 6 from 10.3 to 12.5 micrometers. The above bands extend from visual to thermal emission and are utilized for various science activities, i.e., world wide crop estimates, blight detection, polution detection, geological studies, detection of mineral deposits, oil and gas reservoirs, etc. Previously, satellite data has been utilized to derive oil potential of an area from implied subsurface structural determinations and tonal anomalies.

Earth structural features are derived from satellite data indicating evidence of faulting, folding, fractures, lineaments, uplifts, basins and drainage patterns all of which contribute to detection of areas favorable for oil and gas accumulation and trapping. Tonal anomalies are interpreted to be surface mineral, soil and vegetation modifications caused by microgas seeps over a period of time and are detectable from the satellite data. Tonal anomalies can be a fossilized remnant of those mineral modifications.

All of the above satellite features provide clues as to where oil and gas might be found, but does not provide direct evidence as to whether oil and/or gas may be trapped in commercial quantities. The following describes a procedure which can be utilized to provide direct satellite data evidence that oil and/or gas has been trapped, and, in addition, the data can be quantized for comparison with known oil and gas deposits.

The technique depends on the well known and documented vertical migration of hydrocarbon gases from deep seated oil and gas reservoirs to the surface of the earth where venting occurs. The hydrocarbon gas microseep detection survey which samples and measures those hydrocarbon gases found at three foot depth has been very successful at locating and pinpointing oil and gas reservoirs. This system is covered by U.S. Pat. No. 4,310,057 and confirms the hydrocarbon gas vertical migration theory.

U.S. Pat. No. 4,490,613, previously referenced, describes a method for directly detecting the hydrocarbon gas cloud adjacent to the earth above oil and gas reservoirs by means of irradiation of potential areas with selected coherent wave lengths of infrared radiation which energizes the hydrocarbon gas molecules at their fundamental frequencies into a higher energy state whereupon the molecules drop back to an energy ground state and at the same time release electromagnetic energy at a slightly longer wave length than the energizing wave length thereby permitting detection of the re-radiated energy by proper use of filters and electronic imaging devices.

The above patent also covers five specific "windows" A, B, C, D, and E, which are narrow regions in the electromagnetic spectrum where the fundamental frequencies of the hydrocarbon gas molecules of interest group together, which permits amplification of detection at the window wave length, whether detection is by means of re-radiation or absorption phenomena. Detection of the hydrocarbon gas cloud can be accomplished utilizing any one of the five windows cited by means of the techniques herein described.

The windows also permit detection of various groups of hydrocarbon gas molecules together. For example, window A includes methane, ethane, propane and butane in fairly equal amounts, whereas window B is largely ethane and propane, window C is largely propane and windows D and E entirely propane. By viewing the earth at the various window frequencies, a judgment can be made as to whether the area is trending toward oil or gas.

All of the above frequency data is derived from the National Bureau of Standards Publication NSRDS-NBS-39 "Tables of Molecular Vibrational Frequencies", Consolidated Volume I. This same document is incorporated herein by reference as a part of this disclosure.

In order to utilize satellite data to detect the hydrocarbon gas cloud at the surface of the earth certain conversions must be made: Hydrocarbon gases, as all materials do, have fundamental vibrational frequencies or wave lengths characteristic of each type molecule. These fundamental frequencies have been converted to the equivalent wave length for ease of mathematical manipulation. The five windows above describe where the fundamental frequencies group together and provide the best opportunity for detecting the hydrocarbon gas cloud at the surface of the earth.

The Landsat thematic mapper views the earth largely by reflected solar radiation along with some thermal radiation in the longer wavelengths. To detect the hydrocarbon gas cloud at the surface by means of the satellite data, the molecular vibrational fundamental frequencies have been mathematically converted from vibration to wave length. It was determined that initially windows A and B central wave lengths would be the target for mathematical conversion. Conversion is necessary since the earth is viewed by the satellite in band 7 at 2.08 to 2.35 micrometer wave lengths and band 6 at 10.3 to 12.5 micrometer wave lengths. Conversion can be accomplished by use of certain specific ratios, percentages or factors. Use of percentages is hereby described. To view the earth at the window A central wave length it was mathematically determined that 41.2% of band 6 would be combined with 58.8% of band 7 to provide a composite wave length of about 3.39 micrometers which is about the center of window A. Absorption of incident solar radiation was expected at the above wave lengths by the hydrocarbon gas cloud when and if present at the earth surface.

To view the earth at window B central wave length, portion of band 6 and a portion of band 7 are similarly combined to provide a combined frequency of 4.61 micrometer wave length, which is the central wave length for window B. The method of devising the proportions needed from each band to achieve an effective wave length signal will be described subsequently. It is emphasized that conversion can also be accomplished by the ratio method or factor method.

Satellite data at a composite wave length of 3.39 micrometers and 4.61 micrometers (windows A and B) was used to study an oil producing of Cook County, Tex. When viewed on both the color monitor and isometric monitor, definite radiation absorption at the windows selected (both windows A and B) indicates the presence of hydrocarbon gas clouds in the areas where oil and gas production is known to exist. Absorption was displayed on the color monitor as a dark area, which outlined the known oil pools for the area observed. This effect had never been previously observed by the normal way of viewing the satellite data. The isometric monitor confirmed the absorption of incident solar radiation by display of a depressed (low energy) area exactly conforming to the dark area on the color monitor. Field tests confirmed the presence of hydrocarbon gases.

In addition to the above absorption areas a new effect referred to as microdrainage patterns was vividly displayed at certain color intensity adjustments. This microdrainage effect has never been previously observed by satellite data analysis. The potential use for the microdrainage pattern is employment as an aid for well site selection, since the patterns were definitely subsurface and not related to any surface feature. The patterns are believed to be indicative of oil/gas deposition patterns.

In addition to identification of the areas of occurrence of hydrocarbon gas clouds, quantification of the hydrocarbon gas could can be practiced similar to the procedure outlined in U.S. Pat. No. 4,490,613 but modified to include the satellite data hydrocarbon gas cloud detection procedure. For this purpose a standard brightness or darkness patch is used to provide the capability to adjust the monitor brightness to a repeatable standard value both for repeatability and comparison of undrilled areas to known oil/gas production. The standard brightness/darkness patch can be incorporated into the color monitor or can be established as a separate fixed brightness scope.

A quantification procedure begins with the display of the area to be quantified on the color monitor which is adjusted to the standard brightness of the patch or scope. This scene is then stored in a computer memory bank. The scene is a display of window A made up of 41.2% of band 6 and 58.8% of band 7. The composite signal for window A is then removed from the monitor. This may be done by removing the instruction to view 58.8% of band 7 from the composite leaving only the 41.2% of band 6 displayed, to drop out the hydrocarbon gas cloud display. This scene is then recorded in a memory bank.

The above procedure is then reversed by again displaying the composite window A scene. This time the instruction to view 41.2% of band 6 is removed leaving 58.8% of band 7 on the monitor. The hydrocarbon gas cloud drops out of the displayed scene. This scene is then recorded in the memory bank.

The window A composite with hydrocarbon gas cloud is again displayed and adjusted to the standard brightness value. A TOPO map or oil map of the area of interest is positioned on the screen such that the TOPO map or oil map exactly matches up with the satellite data scene. The stored memory data for 41.2% of band 6 is subtracted from the composite scene. Then the stored memory data for 58.8% of band 7 is subtracted from the composite scene. These steps will leave the dark hydrocarbon gas cloud imposed on the TOPO map at the proper location. A print of the gas cloud data scene is then made for record purposes.

A step neutral density filter (black to white) is then utilized to contour areas of the hydrocarbon gas cloud of like density. The contour lines are numbered in accordance with numbers established for each step of the neutral density filter. This procedure can be accomplished manually or by means of an X-Y plotter. This exercise is first accomplished for known oil or gas production within the area of interest to provide a reference. The undrilled hydrocarbon gas anomaly is then contoured.

An alternate way to quantify the hydrocarbon gas cloud is to assign a false color to each degree of absorption utilizing a step neutral density filter as a guide for assignment of colors on the color monitor. Red can be used to denote the darkest shade (greatest absorption), orange (next lighter degree of absorption), yellow (third lightest degree of absorption), green (fourth lightest degree of absorption), and blue (fifth lightest degree of absorption). Actual hydrocarbon gas concentration values can be assigned by hydrocarbon gas sampling field tests for the area of interest.

To obtain direct comparison with known oil/gas producing areas in the same region the same procedure is followed to calibrate and render a judgment or to high grade undrilled areas.

The entire above, on shore, hydrocarbon gas detection procedure derived from satellite data can also be applied to lake, sea or ocean areas. The hydrocarbon gas emissions are known to occur off shore as well as on shore. Some adjustments are required for ocean depth, current direction and velocity which data is available from Bathymetric maps. Some adjustments for wave length band percentages or factors are normally necessary because of differences in land vs water temperature/absorption values. Wind is also a factor for oceanic areas, however, these necessary adjustments can be quantified for specific oceanic environments. For this disclosure the factor method will be used. The current method used for detecting hydrocarbon gas microseeps offshore is now described.

Hydrocarbon gas microseeps occur off-shore as well as on-shore and can be detected by the system and methods of this invention. The present practice uses a water intake device towed behind a boat at a set depth and water samples are pumped aboard at a set rate. The hydrocarbon gas is extracted from the water sample and measured for species and concentration in the same way samples are measured onshore. The boat is equipped with precision navigation equipment to record the position of the water intake device at all times. Certain corrections are made for current direction and velocity and water depth. Gas chromatograph equipment is a part of the on board laboratory for gas concentration measurement purposes. This technique is currently used for off-shore hydrocarbon gas surveys and is very effective, but is slow and expensive. A far more efficient and cost effective method is to apply the principles as above described for on-shore satellite hydrocarbon gas cloud detection to off-shore surveys. This can be done utilizing the same techniques described in paragraphs above or by means of a slight modification of those techniques. The following is a description of the use of band 2 (green reflectance band) of TM data together with bands 6 and 7 for off-shore hydrocarbon gas cloud detection and mapping. Three bands of tape were selected from the Landsat data bank covering the area of interest. The procedure requires one visible band which can be band 2 or 3 or even a combination of bands 2 and 3 ratioed to provide maximum topographic visibility in combination with band 7 which contain data from 2.08 micrometers to 2.35 micrometers plus band 6 which contains data from 10.3 micrometers to 12.5 micrometers. Band 2 is the green reflectance band from 0.52 micrometers to 0.60 micrometers and band 3 is the red reflectance band from 0.63 micrometers to 0.69 micrometers. Band 2 in combination with bands 6 and 7 will be used in this example, for the reason that the green band penetrates water to a greater degree than other bands and for that reason is more useful for offshore mapping of hydrocarbon gas anomalies. The first operation is to direct the computer to store in the disc pack memory the complete raw data from the magnetic tapes of bands 2, 6, and 7. The magnetic tapes were derived from the master tapes which recorded data direct from Landsat or Seasat. The data is actually a magnetic intensity reading ranging as an example from 0 to 150 depending upon the intensity of the original signal from each individual sensor (Pixel) generated at the time the satellite was viewing the earth.

A histogram for each pixel is created which provides an intensity value from 0 to 150 maximum range for the raw data. To improve resolution this range is increased to 0 to 256 on a log ratio basis electronically by computer. At this point in time the histogram is examined for quality and necessary adjustments are made, including adjustments to compensate for degradation of raw data quality due to factors such as sun angle, cloud cover, snow cover, moisture, conditions of vegetation, weather, etc.

After quality adjustments have been made, a level of grey is assigned to each intensity level from 0 to 256 on a basis which matches the intensity level. A remap routine is then initiated which requires skewing of pixel geometry to obtain a flat picture of the earth. This operation sharpens and squares the edges of each individual pixel.

At this point bands 6 and 7 are factored in such a way as to shift the center of satellite data band to the center of the window selected for detecting the hydrocarbon gas microseepage. This discourse utilizes window A centered at 3.39 micrometers. Since band 2 is centered at 0.65 micrometers a multiplication factor of 6.054 is used to obtain 3.39 micrometers which is the center of Window A. Since band 7 is centered at 2.215 micrometers, a multiplication factor of 1.53 is used to obtain 3.39 micrometers. Since band 6 centers at 11.4 micrometers, a multiplication factor of 0.297 is used to obtain 3.39 micrometers which is the center of window A. Other techniques such as use of percentages for each band or ratioing the bands can also be used as previously described.

Band 2 (green band) is now programmed to be viewed on the RGB (color) monitor. This visible band displays various topographic features such as creeks, ponds, roads islands, etc. At this point band 2 is taken through an electronic color generator which is equivalent to a color wheel. Starting at a "0" value for grey at any selected point on the color wheel colors are assigned corresponding to the various values of grey from 0 to 256 in a progressive manner. Color hue and contrast intensity can also be assigned at this time.

At this point a false color image can be viewed on the screen. The next step is to rotate and fit the image or oil map to assure that the tape image matches the known mapped area. To do this, an X-Y system is used. The total picture consists of 512 lines of 512 pixels to each line, therefore the pixel number and line number can locate any point on the entire picture. To match the map with the tape image the operator selects a known point on the map and determines the line pixel number which is digitized and transferred to the screen and becomes a control point. About fifty control points are selected for each scene. The operator sets the cursor to each control point and records the line/pixel number. These are recorded in the memory and provide the basis for maintaining position. The computer warps the image so that the control points match the image. The operator then runs the scene through a statistical test and compares for correlation. Corrections, if needed, can be made at this time.

After completing the map-matching operation the band 2, 6 and 7 data mathmatically converted to view the window selected is retrieved from the disc-packs, and projected onto the screen into the matched position. From this point on data can then be analyzed. With this graphics package, lineaments and anomalies can be traced and recorded in a memory separate from the Landsat theme. Adjustments to enhance the hydrocarbon gas microseep cloud for visibility are then made. The cloud normally appears as a dark patch due to energy absorption; however, adjustments can be made to cause the cloud to be bright or in color. Also, to test which band multiplication factors or ratios are best, the intensity value for ratios or factors on a scale of 0 to 100 can be scanned for band 2, band 6, and band 7 to visually determine which ratio or factor in practice actually proves most effective for display of the hydrocarbon gas cloud. The same procedure can be used to view any window from any band combination, to achieve the specific exploration objective.

When the best and most effective RGB monitor display of the hydrocarbon gas cloud is achieved, the same scene is viewed on the isometric green screen monitor. The hydrocarbon gas cloud shows up as a low area on the isometric monitor indicating low energy, therefore, absorption has occurred. This low area corresponds to the dark area on the RGB monitor and serves to confirm the presence of electromagnetic wave absorption by hydrocarbon gases.

It is known that the best petroleum producing areas generally exhibit high emissions of hydrocarbon gases, therefore, the capability to quantize the hydrocarbon gas cloud as previously described is a very useful exploration tool. An alternate quantization method is now described.

To quantize an anomaly, a known oil or gas producing field in the area of interest is selected. A scale for the hydrocarbon gas cloud is then established. Any scale can be used, however, it is convenient to use 100 as the quantity for the highest absorption exhibited by the known production with 0 established for no absorption. The gradient scale selected can be 5 or 10 depending upon conditions for the particular area. For example, 10 can be used as a scale to indicate the absorption exhibited by the reference pool. Thus, 110 would indicate 10% above the maximum absorption exhibited by the reference pool. In this manner the undrilled anomalies can be quantitatively compared with each other and with the reference pool. The standard brightness/darkness patch or monitor plus the neutral density filter are used for establishing the exact number to be used for controlling the gradient selected.

The capability of transfering the quantized hydrocarbon gas cloud anomaly directed to an uncluttered topographic map is an excellent tool for making management decisions such as acquisition of acreage, release of acreage, drilling program planning and many others. In order to transfer the quantized hydrocarbon gas cloud anomaly, all background data contained in the Landsat tape is subtracted from the system described above, leaving only the quantized hydrocarbon gas cloud which is then rotated onto a previously prepared map of the area. Control points are checked for alignment, adjustments are made and then the combined scene, map plus quantized hydrocarbon gas cloud, is transferred to a photograph by the normal photographic transfer process utilized to obtain a photo copy of the scene depicted by the RGB monitor.

An unexpected advantage of the system of this invention is that of being able to locate microdrainage areas in the earth. In order to be able to discern micro weathering and drainage patterns utilized, the same harmonies can be used as with detection of surface hydrocarbon gases. With the adjustment of the hue on the RGB monitor so that the low value readings appear a dark brown to a dark golden brown it is possible to identify very small and subtle drainage anomalies which are not detectable with normal false-color imagry. The intensity of the image should be brought up to a high to medium contrast for this purpose.

The potential significance in this discovery lies in the fields of soil conservation, agronomy, and geologic exploration. Many buried geologic structures have extremely subtle surface drainage and weathering patterns associated with them. Thus, this discovery may be useful in siting oil and gas exploratory wells and in mineral exploration. It may also be used to explain subtle soil variation within a limited area.

While the invention has been described with a certain degree of particularity it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A method of locating potential oil and gas deposits in the earth comprising:
    (a) receiving in a satellite reflected solar energy from the earth in a plurality of frequency bands;
    (b) transmitting signals indicative of the received reflected energy of each of the plurality of frequency bands;
    (c) recording on the earth signals received from step (b), which signals are indicative of reflected solar energy, the reception, transmission and recordation being carried out in a manner capable of providing a map of a selected portion of the earth's surface;
    (d) applying a factor to at least two of the recorded signals each representing a different frequency band and combining the factored signals to obtain a signal characterized by hydrocarbon gas absorption; and
    (e) displaying the obtained signal to indicate areas of hydrocarbon absorption.

2. A method of locating potential oil and gas deposits in the earth according to claim 1 wherein step (E) includes displaying the signals on a video monitor and including the step of overlaying the displayed video with an aligned topographical video to thereby enable the user to accurately geographically identify areas of the earth displaying evidence of hydrocarbon gas presence.

3. A method of locating potential oil and gas deposits in the earth according to claim 1 wherein step (A) includes receiving reflected solar energy in a first band having a wave length of 2.08 to 2.35 micrometers and a second band having a wave length of 10.3 to 12.5 micrometers and wherein step (D) includes combining about 58.8% of said first band with 41.2% of said second band to provide a composite signal having an effective wave length of about 3.39 micrometers.

4. A method of locating potential oil and gas deposits in the earth according to claim 1 including the step of quantifying the degree of hydrocarbon gas absorption of reflected solar energy including the use of optical filters for intensity comparisons.

5. A method of locating potential oil and gas deposits in the earth according to claim 1 wherein step (E) includes displaying the obtained signal on a video monitor.

6. A method of locating potential oil and gas deposits in the earth according to claim 5 wherein said video monitor is color hue adjustable to disclose subsurface hydrocarbon microdrainage patterns.

7. A method of locating potential oil and gas deposits in the earth covered by water, such as in the oceans, according to claim 1 including the step of:
    adjusting the displayed signals to compensate for ocean depth and current direction and velocity.

8. A method of locating potential oil and gas deposits according to claim 1 including the step of:
    projecting from the satellite a coherent beam of electromagnetic energy in a scanning pattern.

* * * * *